United States Patent
Patel et al.

(10) Patent No.: US 11,952,261 B2
(45) Date of Patent: Apr. 9, 2024

(54) AUTOMATIC REMOTE MANAGEMENT OF FUEL FILLING STATIONS

(71) Applicant: BULL SAS, Les Clayes sous Bois (FR)

(72) Inventors: Krupal Nilesh Patel, Gujarat (IN); Ashish Bari, Gujarat (IN); Pranjali Sandeep Admane, Maharashtra (IN)

(73) Assignee: ATOS GLOBAL IT SOLUTIONS AND SERVICES PRIVATE LIMITED, Thane (IN)

( * ) Notice: Subject to any disclaimer, the term of this patent is extended or adjusted under 35 U.S.C. 154(b) by 164 days.

(21) Appl. No.: 17/830,481

(22) Filed: Jun. 2, 2022

(65) Prior Publication Data

US 2022/0388832 A1 Dec. 8, 2022

(30) Foreign Application Priority Data

Jun. 2, 2021 (EP) .................................. 21177433.6

(51) Int. Cl.
*B67D 7/32* (2010.01)
*B67D 7/22* (2010.01)

(52) U.S. Cl.
CPC ........... *B67D 7/3245* (2013.01); *B67D 7/221* (2013.01)

(58) Field of Classification Search
CPC .............................. B67D 7/3245; B67D 7/221
See application file for complete search history.

(56) References Cited

U.S. PATENT DOCUMENTS 5,423,457 A 6/1995 Nicholas et al.

FOREIGN PATENT DOCUMENTS

| CA | 2498160 A1 | 7/2006 |
| GB | 2138947 A | 10/1984 |

OTHER PUBLICATIONS

European Search report for corresponding EP Application 21147433, dated Nov. 22, 2021.

*Primary Examiner* — Kevin R Barss
(74) *Attorney, Agent, or Firm* — MEAGHER EMANUEL LAKS GOLDBERG & LIAO, LLP

(57) ABSTRACT

Apparatus (2) for monitoring a set of fuel dispensers ($10_1$, $10_2$, ... $10_N$) of filing stations ($1_1$, $1_2$, ... $1_M$), for providing fuel stored in tanks (11) to vehicles, may include interfaces (21) to receive measurements from output probes ($30_1$, $30_2$, ... $30_N$) measuring fuel flowing through nozzles ($11_1$, $11_2$, ... $10_N$); measurements from amount probes (31) measuring a stored amount contained within the tank; and receipt data of fuel delivered; a memory (22) to store at least part of said measurements, and a computing means (23). The computing means may be configured for: determining two subsequent fuel deliveries for which stored amounts measured at the start of said deliveries are substantially equals; determining a suspicious situation by comparing said receipt data corresponding to said subsequent fuel deliveries with the sum of measurements provided by said output probes during the time period between these two subsequent deliveries; and triggering an action when a suspicious situation is determined.

10 Claims, 3 Drawing Sheets

| RO Code | Tank | Product | Start Time | Initial Height | Initial Stock (L) | End Time | Final Height | Final Stock (L) | Invoice Qty (L) |
|---|---|---|---|---|---|---|---|---|---|
| 111111 | 1 | MS | XX:XX | 100 | 3000 | XX:XX | 500 | 7989 | 5000 |

Fig. 5

AUTOMATIC REMOTE MANAGEMENT OF FUEL FILLING STATIONS

CROSS-REFERENCE TO RELATED APPLICATION

This application claims priority to European Patent Application 21177433.6, filed on Jun. 2, 2021, which is incorporated herein by reference in its entirety.

TECHNICAL FIELD

The invention relates to management of fuel filing stations. In particular, it may apply to the detection of short or excess delivery of fuel without manual intervention, for instance from a remote location.

BACKGROUND

A filling station is a facility that, in particular, sells fuel for motor vehicles.

Filing stations may be known under different names around the world, like fueling stations, gas stations, gasoline stands, petrol pumps, petrol bunks, petrol stations, service stations, fuel stations etc., not mentioning other terminologies in other languages.

Various types and subtypes of fuels are available and depend on countries. Fuel is usually stored within an underground tank in the filling station and is pumped by fuel dispensers into vehicles.

Fuel may include, for instance, gasoline (or petrol), diesel, compressed natural gas, CGH2, HCNG, LPG, liquid hydrogen, kerosene, alcohol fuel (like methanol, ethanol, butanol, propanol), biofuels (like straight vegetable oil, biodiesel).

In general, these filling stations are retail outlets managed by large Oil and Gas companies or their partners.

Further explanations about filling stations in general and their ecosystem may be found on the relevant Wikipedia page:

en.wikipedia.org/wiki/Filling_station

Now when a consumer is filling his or her vehicle at a filling station, the display on the pump is the only metric letting him/her verify that the exact amount of fuel has been delivered into the vehicle.

However, there may factors that alter the accuracy of this display. These factors are mainly two-fold:

First, more fuel can be dispensed, than intended, by the Nozzle due to wear and tear that the entire mechanism undergoes due to repeated usage, causing loss to the vendor.

Also, some human factor may impact by mischievously manipulating the display by certain vendors who try to extract more profit by selling less fuel to the customer using multiple ways.

Traditionally, such Short/Excess activities can be caught only by physical inspection at the Retail Outlets, which is cost intensive in terms of time and manpower involved and less iterative over the numerous Retails Outlets spread throughout various geographies. It should be noted that there are more than 100,000 filling stations in the USA, or in China, more than half this among in India, etc. so that visiting physically and regularly each filling station is not realistic, and a trade-off is applied between the number of visited stations and the period of visits.

SUMMARY

An aim of the invention is to address these issues and to provide a method and an apparatus to improve the situation.

In particular, in a first example embodiment, an apparatus for monitoring a set of fuel dispensers of filing stations adapted to provide fuel to vehicles, said fuel being stored in tanks associated to said filing stations, said apparatus comprising:
    interfaces to receive measurements from output probes measuring fuel flowing through nozzles of said fuel dispensers; measurements from amount probes measuring a stored amount contained within said tank; and receipt data of fuel delivered into said tanks;
    a memory to store at least part of said measurement;
    computing means configured for:
        determining two subsequent fuel deliveries for which stored amounts measured at the start of said deliveries are substantially equals,
        determining a suspicious situation by comparing said receipt data corresponding to said subsequent fuel deliveries with the sum of measurements provided by said output probes during the time period between said two subsequent deliveries;
        triggering an action when a suspicious situation is determined.

This embodiment may comprise other features, alone or in combination, such as:
    said measurements are received to said interface from a centralized transmitted installed within each of said filing stations;
    triggering an action comprises determining whether said suspicious situation is an excess delivery situation or a short delivery situation;
    triggering an action comprises providing an alert associated to an identifier of a fuel dispenser;
    the computing means comprises
        at least one processor; and
        at least one memory including computer program code, the at least one memory and computer program code configured to, with the at least one processor, cause the performance of the computing means.

In a second example embodiment, a system is provided, comprising the apparatus as previously defined, and at least one centralized transmitter configured to receive measurements from said probes and to transmit them to said interfaces.

In another example embodiment, a method is provided for monitoring a set of fuel dispensers filing stations, adapted to provide fuel to vehicles, said fuel being stored in tanks associated to said filing stations and comprising means for delivery of fuel by tanker trucks, said method comprising:
    transmitting to interfaces of a monitoring apparatus measurements from output probes measuring fuel flowing through nozzles of said fuel dispensers; measurements from amount probes measuring a stored amount contained within said tank; and receipt data of fuel delivered into said tanks;
    storing into a memory of said monitoring apparatus at least part of said measurements;
    determining two subsequent fuel deliveries for which stored amounts measured at the start of said deliveries are substantially equals;
    determining a suspicious situation by comparing said receipt data corresponding to said subsequent fuel deliveries with the sum of measurements provided by said output probes during the time period between said two subsequent deliveries;
    triggering an action when a suspicious situation is determined.

This embodiment may comprise other features, alone or in combination, such as:
triggering an action comprises determining whether said suspicious situation is an excess delivery situation or a short delivery situation.
triggering an action comprises providing an alert associated to an identifier of a fuel dispenser.

In a still another example embodiment, it is provided a computer readable medium encoding a machine-executable program of instructions to perform a method as previously defined.

BRIEF DESCRIPTION OF THE FIGURES

Some embodiments are now described, by way of example only, and with reference to the accompanying drawings, in which:

FIG. 5 show an example of table for storing receipt data.

DESCRIPTION OF EMBODIMENTS

The invention allows to automatically monitor a set of fuel dispensers. The monitoring may be performed from a remote position and may allow to determine a set of suspicious situations.

For these situations, some physical visits may be planned, but the number of suspicious situations is far less numerous than the whole set of monitored filling stations. In additional, the physical visits can be planned as soon as a suspicious situation is detected so as to avoid an excess/short delivery situation to last and have strong economic impacts.

However, another advantage may lie in fact that the detection of the suspicious situation may be done remotely. In many cases, the cause of the suspicious situation may be investigated remotely as well, either by automatic means or by human intervention, but, even in the latter case, on-site intervention can be dramatically reduced.

It becomes then technically feasible to monitor a large set of fuel dispensers with fine-grained time periodicity.

In addition, for doing sol, the invention allows to address at least two challenges, which may explain the lack of automatic First of all, fuel tanks are usually installed underground, with no means to visually inspect the conditions or the activities happening within it. The tanks remain underground for at least 30 years or so, which is the maximum prescribed usage period set by many manufacturers. During this long period, inclinations or dents may impact the tank's platform or surface, due for instance to the natural movement of the earth. Such evolutions cannot be detected. However, the changes to the pre-set tank configuration and calibration causes discrepancies in the measurements of fuel levels in the tank.

Also, as the wear and tear of the various devices installed at a filling station depends on various natural and artificial factors, their failures are uncertain and unpredictable in nature. It is hence practically impossible to predict when malfunctions would occur, causing short/excess deliveries of fuel.

Figure 1:
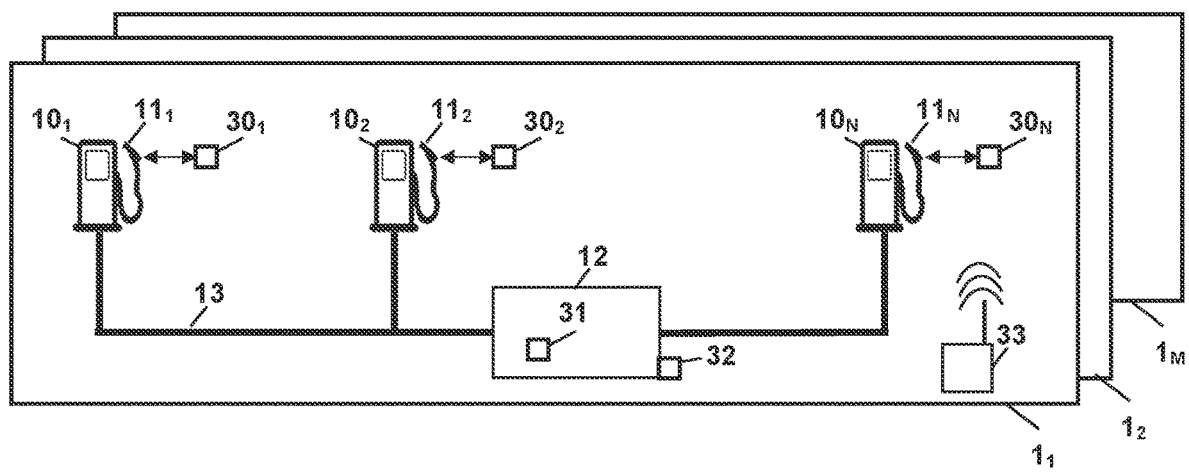
FIG. 1 schematically illustrates a system comprising elements of a filling station and a monitoring apparatus, according to embodiments of the invention.
Figure 1:
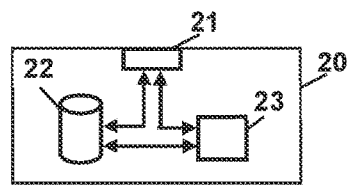

In reference to FIG. 1, a monitoring apparatus 20 is provided to monitor a set of several filling stations $1_1$, $1_2, \ldots 1_M$.

The monitoring apparatus 20 may be installed within premises of a gas and oil company, to whom the filling stations belong (as retail outlets). Accordingly, a single monitoring apparatus 20 may monitor filling stations that are spread over a wide geographical area.

Only one filling station $1_1$ is represented in the figure for purpose of clarity of this figure, but this representation shall be generalized to other filling stations of the set.

A filling station $1_1$ may comprise a set of fuel dispensers $10_1, 10_2, \ldots 10_N$. Each fuel dispenser is associated to at least one nozzle, respectively $11_1, 11_2, \ldots 10_N$, which allow delivering fuel into the vehicles visiting the filling station (although only one nozzle associated to each dispenser is depicted, in real situations, many nozzles can be provided).

When delivering a vehicle, fuel dispensers pump fuels from a tank 12, through pipelines 13.

The tank is usually underground, beneath the concrete platform on which lye the filling station premises. An opening is provided so as to transfer, or deliver, fuel from fuel tanker trucks down to the tank 12.

As earlier said, fuel may comprise various types like petrol, diesel, biofuel, kerosene, alcohol fuel, compressed gas, etc.

Some payment facilities are also provided within the filling station, which are usually either associated to the fuel dispensers themselves or centralized at a kiosk.

According to the invention, some probes are provided to gather measurements about the operations at the filling station.

Output probes $30_1, 30_2, \ldots 30_N$ are associated to each dispensers $10_1, 10_2, \ldots 10_N$, respectively. These probes are configured to read the stored data from the dispensers' memories and transmit these data to an interface 21 of the monitoring apparatus 20, preferably on real time basis as and when one customer is served.

Every dispenser captures and stores details like quantity sold to each customer with other granular details like price, amount, nozzle start and end meter readings and product properties, these details vary across OEM's. These data, or part of these data, may be transmitted to the monitoring apparatus.

Also, an amount probe 31 is provided and configured to measure the level of fuel contained within the tank 12. Like the output probes, it is further configured to transmit its measurements to an interface 21 of the monitoring apparatus 20. It can be provided more than one amount probe, especially in case a filling station comprises more than one tank.

When a tanker trunk delivers fuel into the tank, receipt data are registered and available. Such receipt data are also transmitted to an interface 21 of the monitoring apparatus 20.

The data (or measurements) from the output probes and of the amount probe may be transmitted in real-time, but, preferably, they are transmitted according to pre-set periods (for instance every half hours). This latter option allows to reduce the transmission traffic without really impacting the quality of the monitoring.

Figure 2:
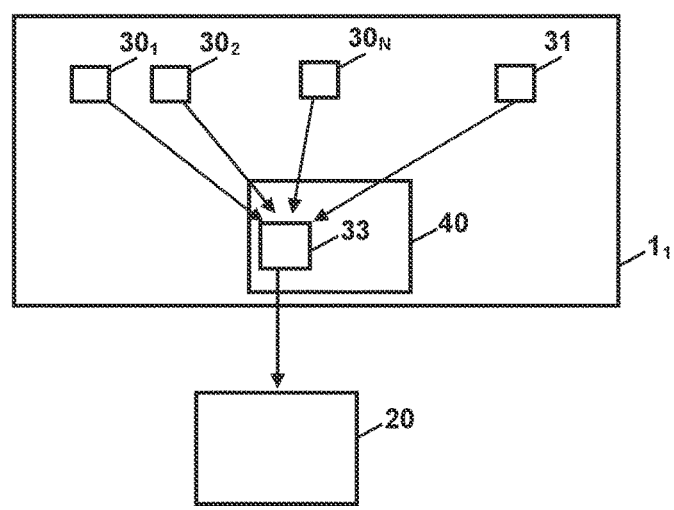
FIG. 2 schematically illustrates transmission arrangement between probes and a monitoring apparatus, according to embodiments of the invention.

The FIG. 2 schematically illustrates a possible embodiment for a transmission arrangement between the probes and the monitoring apparatus 20.

According to this particular arrangement, the probes can be embodied as IoT (Internet of Things) devices. They are adapted to communicate by cable or wireless means with a centralized transmitter 33.

According to embodiments, the centralized transmitter 33 is embedded inside a forecourt controller (FCC), 40, otherwise supported by cable connection. This FCC system controls fuel dispensers, outdoor payment terminals, price signs, tank controllers, etc. They can be either embedded or computer-based. They may then be responsible of recording, storing (in a local memory) and transferring data collected by the IoT devices of the related filling station.

According to embodiments, the IoT devices may have further functionalities than the ones previously described.

For instance, the IoT devices embedding the output probes may capture various data like volume and amount of fuel dispensed, asset information, product information, information regarding the fuel tank connected to the associated fuel dispenser, etc. All these data can be transmitted to the FCC system according to configuration (for example according to a pre-set time period).

In a similar way, the IoT devices embedding the amount probe(s) may capture the height of the fuel in the tank, periodically, based on its configuration. These sensors also help us understand the quantity of fuel decanted into the tanks, supplied by the refineries, as well as the quantity of fuel sold from these tanks.

According to embodiments, the amount probe measures a height, or level, of the fuel inside the tank. This height or level represents the amount of fuel, knowing the geometry of the tank, or if calibrated.

The centralized transmitter 33 may provide internet connectivity (e.g. wireless) allowing the transmission of collected data to the monitoring apparatus 20.

Here again, the transmission of data may be performed according to pre-set time period, but other options are available.

The monitoring apparatus 20 may be a server installed in premises of the gas and oil company to which the filling station belong, or in a service provider to which the gas and oil company has contracted. Also, the monitoring apparatus may be installed on a farm of servers or within a computing cloud.

The monitoring apparatus comprises an interface 21 to receive measurements from the output probes $30_1, 30_2, \ldots 30_N$; measurements from the amount probe(s) 31 and receipt data of fuel delivered into the tanks by tanker trunks.

The monitoring apparatus comprises a memory 22 to store at least part of these measurements, as well as computing means 23 configured to process these measurements, in order to monitor the fuel dispensers.

According to embodiments, the computing means comprises at least one processor; and at least one memory including computer program code, the at least one memory and computer program code configured to, with the at least one processor, cause the performance of the computing means.

According to embodiments, the received measurements are consumed in real-time so as to determine suspicious situations and trigger actions as early as possible.

Some further analytical solutions may be also provided to take benefit of the data made available thanks to the arrangement of embodiments of the invention.

Also, the receipt data may be provided by FCC system 40 to the monitoring apparatus 20.

For instance, invoices may be created from fuel delivering companies (refineries) and stored in an Enterprise Resource Planning (ERP) system. Each invoice has details like product quantity, tank truck details, retail outlet details, etc.

The monitoring apparatus (or any other related centralized platform) may remotely download all invoices from all supply units on real time basis. These invoices are then pushed to FCC system 40 of the respective Retail Outlets based on their unique CMS code (or SAP code).

The FCC system may be configured to interwork with a console, so that a user may acknowledge and validate the invoices.

Furthermore, according to embodiments, the amount probes may stay in active communication with the FCC system 40, so as to help a user to view the stock level in any tank at any given time through the console.

Further, the FCC system 40 may be configured to detect the fuel delivery (or decantation event) when the amount probe rises continuously for 30 seconds straight. This sudden rise for 30 seconds is termed as the starting point for a receipt. Once the amount probe stops moving further up for 30 seconds straight then it is considered as the end of a receipt. The moment this condition is observed by the FCC system, it creates a receipt entry in console with, for instance, the following 4 main details:

Starting Time of a Receipt (T1)
Product Height & Quantity at T1
End Time of a Receipt (T2)
Product Height & Quantity at T2

The FIG. 5 shows an example of table for storing receipt data, wherein "Invoice Qty" is the quantity invoiced from the refinery, and "XX:XX" represents the actual start & end time which is not dependent on any 30 minutes time interval. RO stands for Retail Outlet and the RO number identifier a particular filling station.

The created receipt data may now be required to be acknowledged by mapping it correctly with the invoice details that had already been stored in a console (as explained above). A user feeds the invoice details against the receipt entry created by the FCC system 40 and may submit the proof of receipt which is then pushed to the FCC system.

The later may store the data and further push them to the monitoring apparatus 20 through wireless connectivity. Here, according to this embodiment, the FCC system plays a vital role to accept the invoice details first from central monitoring apparatus, stores it and then pushes back to the monitoring apparatus once the receipt is successfully committed.

Figure 3:
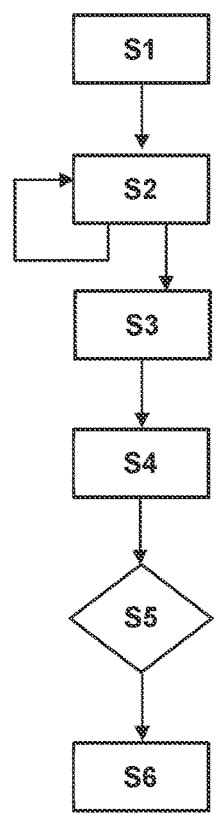
FIG. 3 schematically illustrates a flow-chart of a monitoring method according to embodiments of the invention.

The FIG. 3 shows an example flow chart of a method performed by the monitoring apparatus 20, in collaboration with other elements of the overall system. This flow chart is an illustrative indication only, and steps may be arranged differently without departing from the scope of the invention. In particular, steps represent functional or conceptual organization grouping several sub-steps. Such grouping is arbitrary and aims only in the clarify of the explanation, without any technical meaning from a software-coding point of view.

In a first step S1, the interface 21 receives data from a set of filling stations $1_1, 1_2, \ldots 1_M$. These data comprise:

measurements from output probes $30_1, 30_2, \ldots 30_N$ measuring fuel flowing through nozzles $11_1, 11_2, \ldots 11_N$ of the fuel dispensers; this for each serviced filling stations;

measurements from the amount probes 31 measuring a stored amount contained within the tank(s); this again for each serviced filling station, and receipt data of fuel delivered into the tank(s), this again for each serviced filing station.

These measurements and data are stored in the memory 22.

In a step S2, the computing means 23 determine two subsequent fuel decantation into a specific tank for which stored amounts measured just at the start of each decantation event are substantially equals, This step S2 can be triggered by the detection of a fuel delivery from e.g. a tanker trunk. This can be detected by the reception of receipt data from a filling station.

The reception of receipt data can trigger this step S2 but also the subsequent steps of the monitoring method for a filling station and even for one tank. In other words, the monitoring apparatus may be able to monitor several filling stations and several tanks within a given filling stations, each one being associated with one instance of a monitoring method/process.

When any new receipt data are received, the monitoring apparatus may retrieve the two latest receipt data from the memory of the same amount probe or tank. Then, the measurements of the newest receipt data is compared with the measurements of the other one.

If these two measurements from the receipt data are close enough, then a pair is determined to which subsequent steps S3-S5 could be applied. If the measurements are not close enough, then the measurements of recent receipt data are compared with amount probe measurements for further finding a match. If still the measurements are not close enough, no matching is performed, and the monitoring apparatus just loops back and waits for a new receipt data. Then, the same step S2 applies to compare the related measurements and determine if they match.

Figure 4:
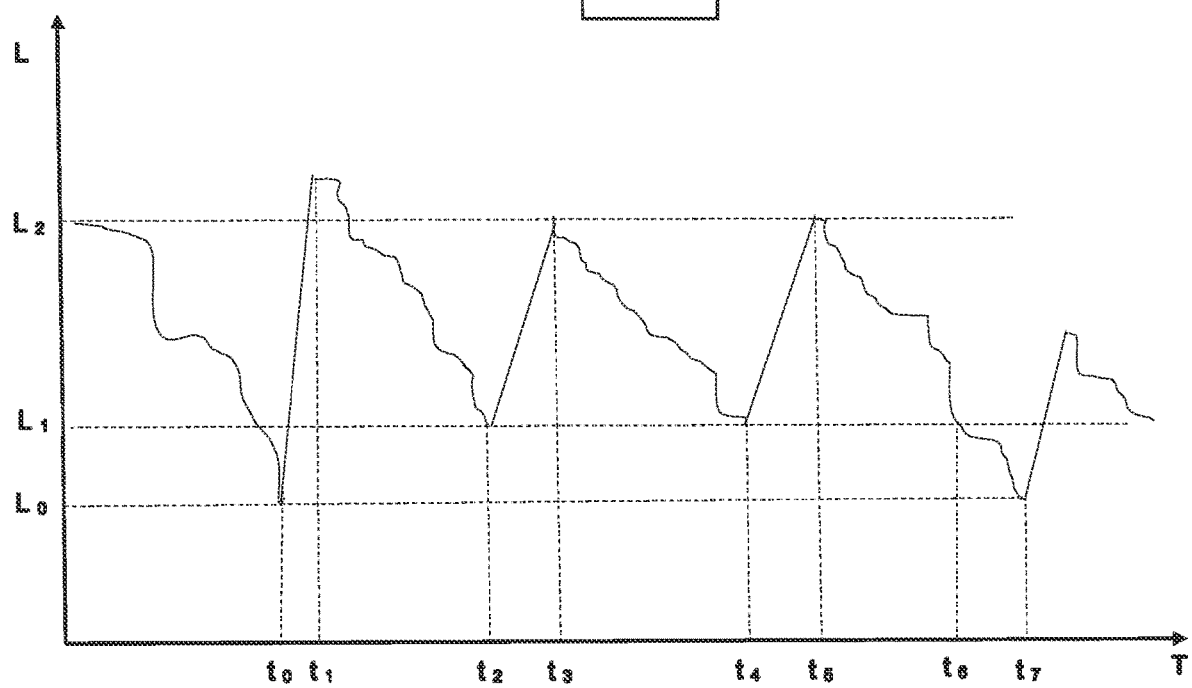
FIG. 4 schematically illustrates the determination of two subsequent fuel deliveries for which stored amounts measured at the start of the deliveries are substantially equal, according to embodiments of the invention.

The FIG. 4 shows an example of application of this step S2

Abscissas represent the time T, and ordinates represent the amount L of fuel measured by the amount probe. The curve shows abrupt and discontinuous rises when fuel is delivered by tanker trunks, and slow descents while the fuel is delivered to vehicles.

This example figure depicts the three scenarios mentioned in the above explanations.

When Receipt data points fails to provide a match
  On observing 2 successive decantation events taking place at to and other at $t_2$, we can see that the starting height at the start of the two decantation events i.e. at to and $t_2$ are not in the close range of +/−10 mm and also the level L0 at to is lower than L1 at $t_2$. Hence the system fails to detect any short/excess situations if any.
(2) When Receipt data points are sufficient to provide a perfect match
  On observing 2 successive decantation events taking place at $t_2$ and other at $t_4$, we can see that the starting height at the start of 2 decantation event i.e., at $t_2$ and $t_4$ are in the close range of +/−10 mm and hence the system will detect and provide any short/excess situations if any.
(3) When Receipt data combining with Stock data provides a perfect match
  On observing 2 successive decantation events taking place at $t_4$ and other at $t_7$, we can see that the starting height at the start of 2 decantation event i.e. at $t_4$ and $t_7$ are not in the close range of +/−10 mm but since L1 at $t_4$ is above L0 at $t_7$, the system will search for any height closer to L1 in stock data between the time window $t_5$ and $t_7$. Further to these searches there are 2 possibilities one in favour and other in against.

If the search is successful further derivation for finding short/excess deliveries will be performed else not.

One such example where the search in stock data was successful and same can be understood from FIG. 1 that at some point of time at $t_6$ the stock data provided the height in the close range of +/−10 mm when compared it with the first decantation start at $t_4$ and hence the system managed to create a match using combination of receipt data and stock data, which will further detect and provide any short/excess situations if any.

The terms "substantially equal" may mean that a permissible difference is allowable for the criterion to be met. This permissible difference may be a configurable parameter. An example of such permissible difference may be +/−10 mm in height.

The following steps, S3, S4, S5 aim in determining a suspicious situation when the receipt data corresponding to the subsequent fuel deliveries do not correspond to the sum of measurements provided by the output probes during the time period between these two subsequent deliveries (i.e. at times $t_2$ and $t_4$).

According to embodiments, time $t_2$ represents the start of the previous fuel delivery, $t_3$ represents the end of the previous fuel delivery and $t_4$ represents the beginning of the current fuel delivery.

The step S3 consists in determining this time window on which further analysis will be performed in subsequent steps, S4, S5.

The amounts L before and after the delivery are captured. The difference between these two points gives the exact decanted quantity during the time window, which can be compared with the fuel amount mentioned in the receipt data as shown under Invoice Qty (L) in FIG. 5. By performing this calculation, we are removing our dependency on the calibration chart and thus makes the information independent on calibration and possible deformation of the tank over the years, as previously mentioned.

Also, in a step S4, the measurements of output probes captured during this time window and stored in the memory 22 are retrieved. The sum of these measurements represents the total quantity sold to the end customers.

Then, in a step S5, this sum is compared with the receipt data.

According to embodiments, the sum is compared with the receipt data corresponding to the previous fuel delivery, In scenario (2), explained above, the following points are first recorded:
Time at the start of first decantation ($t_2$)
Time at the end of first decantation ($t_3$)
Time at the start of second decantation ($t_4$)
Invoice Qty of the first decantation from the receipt data that took place between $t_2$ and $t_3$—let the value be I.

In step S4, Nozzles Sales can be calculated in the relevant time window, that is between $t_2$ and $t_4$—let the value be S In step S5, this sum S is compared with data I determined from the receipt data.

If S>I, then we have a possible short delivery situation and

If S<I, then we have a possible excess delivery situation.

In scenario (3), the following points are first recorded:
Time at the start of first decantation ($t_4$)
Time at the end of first decantation ($t_5$)
Time at the start of second decantation ($t_7$)
Time at which stock height matches with start of first decantation ($t_6$)

Invoice Qty of the first decantation from the receipt data that took place between $t_4$ and $t_5$—let the value be I.

Then in step S4, Nozzles Sales is calculated between $t_4$ and $t_6$—let the value be S.

In step S5, this sum S is compared with data I determined from the receipt data:

If S>I, we have a possible short delivery situation and

If S<I, we have a possible excess delivery situation.

This fuel quantity mentioned in this receipt data corresponds to the quantity that is supposed to be consumed during the time window since at time $t_4$ the amount in the tank is reverted back to the same level as before the fuel delivery of time $t_2$.

This comparison allows to determine a suspicious situation when the receipt data do not correspond to the sum of the measurements.

It shall be noted that this determination is based on three different sources of data: 1) receipt data (and delivered quantity contained therein), 2) measurements from the output probes associated to the fuel dispensers, and 3) measurements from the amount probes inside the tank(s).

This diversity of sources allows robustness of the determination, and, as mentioned, to be independent on calibration and variations due to tear and wear of various elements over the year. It allows also to be robust against some mischievous behaviours of owners of filling stations.

In a step S6, an action is triggered when a suspicious situation is determined

According to embodiments, an action may comprise determining whether the suspicious situation is an excess delivery situation or a short delivery situation.

If the sum of the measurements provided by the output probes, calculated in step S4, is more than the quantity delivered as per Receipt data, we have a probable situation of Short delivery.

Similarly, if the sum is less than quantity delivered at time to, then we have a probable case of Excess delivery.

According to embodiments, a variant quantity may be calculated by

Variant quantity=nozzle sales−delivered quantity wherein nozzle sales represent the sum of the measurements provided by the output probes during the time period between the two subsequent deliveries (i.e. decantation events); and delivered quantity correspond to the amount mentioned in the receipt data corresponding to the first one of the two said subsequent fuel deliveries do not correspond to the sum of measurements provided For Short Delivery, the variance quantity is the cumulative short quantity, which can be used to identify the involved Nozzles and their possible short amounts.

For Excess Delivery, one can further calculate cumulative excess quantity=variance quantity−evaporation loss.

The evaporation loss is due to the volatile nature of the fuel and it depends on the sales as the evaporation can happen only when the fuel is delivered to the vehicles, if one assumes the tank to be hermetically closed.

Then, one can define:

Evaporation loss=Nozzle sales*evaporation factor

The evaporation factor depends on the fuel type and reference values for the same are provided by governing bodies of each country.

Once we have the cumulative excess quantity, same will be used to identify the involved Nozzles and their possible excess amounts.

According to embodiments, if there are multiple nozzles connected to one tank, one can then calculate the nozzle sale for each nozzle between the relevant time window, and then calculate the mean of the Nozzle sales Nozzles having sales below the calculated mean value may be eliminated. The reasoning for elimination of Nozzles with less sale quantity is that it is empirically observed that wear and tear is statistically more frequent for Nozzles which are heavily used and thus causing Short/Excess Delivery. These high usage Nozzles have also been generally observed (based on, on field experiences) to be victims of tampering and shorting, as they are easier to manipulate due to high sale volume.

The following table shows an example of sales volumes (in litres) for 8 nozzles, numbered from 1 to 8.

| Nozzle Number | Sales Volume in Litres |
| --- | --- |
| 1 | 35 |
| 2 | 45 |
| 3 | 50 |
| 4 | 60 |
| 5 | 1400 |
| 6 | 1500 |
| 7 | 3000 |
| 8 | 30 |
| Mean Sales Volume | 765 |

We have described earlier about 2 possibilities where short/excess situations can arise, namely:

Wear and Tear of the device, in particular Dispensing Units and their connected nozzles.

Fraud: Franchisee purposely short the quantity to the customers to gain extra profits.

Having said that, when we speak about short/excess situation due to wear and tear of the mechanism, then it is more likely that the nozzles having high sales volumes is creating such a situation, since those nozzles are highly utilised compared to other nozzles connected to a tank where the variant quantity is negative. And other way round, if it is purposely done by a franchisee to gain extra profit then the franchisee will instruct their sellers to use those specific nozzles to serve their customer.

So, in both the cases nozzles that are having higher contribution of sales or usage are considered to have more chances for delivering short/excess In the example depicted on the above table, we can deduce that mean sales is 765 litres, whereas nozzle number 5, 6 & 7 are having individual sales above the mean value. In consequence, these nozzles have higher probability to generate short/excess delivery situations compared to other nozzles. In the said example, if an immediate physical inspection is not possible to plan, then an authority can block 5, 6 & 7 nozzles for further sales, allowing 1, 2, 3, 4 & 8 to continue the sales, with uninterrupted monitoring until the physical inspection is conducted.

According to embodiments, triggering an action may comprise providing an alert associated to an identifier of a fuel dispenser. This alert may be displayed to a Human-machine interface associated with the monitoring apparatus 20.

Then, further action may be performed, according to the alert. Some action may be automatic; some other may be human-based.

The latter may comprise calling a responsible person of the identified fuel dispenser, planning a physical on-site visit of the identified fuel dispenser, analysing statistics of the identified fuel dispenser, etc.

A person of skill in the art would readily recognize that steps of various above-described methods can be performed by programmed computers.

The description and drawings merely illustrate the principles of the invention. It will thus be appreciated that those skilled in the art will be able to devise various arrangements that, although not explicitly described or shown herein, embody the principles of the invention as defined by the claims.

What is claimed is:

1. An apparatus (2) for monitoring a set of fuel dispensers ($10_1, 10_2, \ldots 10_N$) of filing stations ($1_1, 1_2, \ldots 1_M$), adapted to provide fuel to vehicles, said fuel being stored in tanks (11) associated to said filing stations, said apparatus comprising:
 one or more interfaces (21) to receive: measurements from output probes ($30_1, 30_2, \ldots 30_N$) measuring fuel flowing through nozzles ($11_1, 11_2, \ldots 10_N$) of said fuel dispensers; measurements from amount probes (31) measuring a stored amount contained within said tank; and receipt data of fuel delivered into said tanks (11);
 a memory (22) to store at least part of said measurements; and
 a computing means (23) configured for:
  determining two subsequent fuel deliveries for which stored amounts measured at a start of said two subsequent fuel deliveries are substantially equal;
  determining a suspicious situation by comparing said receipt data corresponding to said two subsequent fuel deliveries with a sum of measurements provided by said output probes during a time period between said two subsequent deliveries; and
  triggering an action when a suspicious situation is determined.

2. The apparatus according to claim 1 wherein said measurements are received with said one or more interfaces from a centralized transmitter (33) installed within each of said filing stations.

3. The apparatus according to claim 1, wherein triggering an action comprises determining whether said suspicious situation is an excess delivery situation or a short delivery situation.

4. The apparatus according to claim 1, wherein triggering an action comprises providing an alert associated with an identifier of a fuel dispenser.

5. The apparatus according to claim 1, wherein the computing means comprises:
 at least one processor; and
 at least one memory including computer program code, the at least one memory and computer program code configured to, in combination with the at least one processor, cause the performance of the computing means.

6. A system, comprising:
 an apparatus according to claim 1; and
 at least one centralized transmitter (33) configured to receive measurements from said probes and to transmit them to said interfaces (21).

7. A method for monitoring a set of fuel dispensers (101, 102, \ldots 10N) of filing stations (11, 12, \ldots 1M), each fuel dispenser adapted to provide fuel to one or more vehicles, said fuel being stored in tanks (11) associated with said filing stations and comprising a means for delivery of fuel by tanker trucks, said method comprising:
 transmitting to one or more interfaces (21) of a monitoring apparatus (20): measurements from output probes (301, 302, \ldots 30N) measuring fuel flowing through nozzles (111, 112, \ldots 10N) of said fuel dispensers; measurements from amount probes (31) measuring a stored amount contained within said tank; and receipt data of fuel delivered into said tanks (11);
 storing into a memory (22) of said monitoring apparatus at least part of said measurements;
 determining (S2) two subsequent fuel deliveries for which stored amounts measured at a start of said two subsequent fuel deliveries are substantially equal;
 determining (S3, S4, S5) a suspicious situation by comparing said receipt data corresponding to said two subsequent fuel deliveries with a sum of measurements provided by said output probes during a time period between said two subsequent fuel deliveries; and
 triggering (S6) an action when a suspicious situation is determined.

8. The Method according to claim 7, wherein triggering an action comprises determining whether said suspicious situation is an excess delivery situation or a short delivery situation.

9. The method according to claim 7, wherein triggering an action comprises providing an alert associated to an identifier of a fuel dispenser.

10. A computer readable medium encoding a machine-executable program of instructions to perform a method according to claim 7.

* * * * *